United States Patent [19]

Schlitte et al.

[11] Patent Number: 5,625,024
[45] Date of Patent: Apr. 29, 1997

[54] BRANCHED POLYSILOXANE-POLYETHER-BASED COPOLYMERS, THEIR PREPARATION AND USE

[75] Inventors: Sabine Schlitte, Langenfeld; Hubertus Eversheim, Wermelskirchen; Gebhard Wagner, Odenthal; Karl-Heinz Käsler, Bergisch Gladbach; Jan Mazanek, Köln; Hans-Ulrich Meier-Westhues, Leverkusen, all of Germany

[73] Assignee: Bayer Aktiengesellschaft, Leverkusen, Germany

[21] Appl. No.: 409,113

[22] Filed: Mar. 23, 1995

[30] Foreign Application Priority Data

Mar. 30, 1994 [DE] Germany ............ 44 11 079.0

[51] Int. Cl.$^6$ ............................................. C08G 77/46
[52] U.S. Cl. .................................... 528/29; 528/31
[58] Field of Search ................ 528/29, 31; 525/479

[56] References Cited

U.S. PATENT DOCUMENTS

| | | |
|---|---|---|
| 3,280,160 | 10/1966 | Bailey ............................. 528/29 |
| 3,532,732 | 10/1970 | Rossmy ........................... 528/29 |
| 3,541,127 | 11/1970 | Beattie ............................ 528/29 |
| 3,629,310 | 12/1971 | Bailey ............................. 528/29 |
| 4,497,962 | 2/1985 | de Montigny et al. ............ 556/446 |
| 4,886,551 | 12/1989 | Fink et al. ....................... 106/103 |
| 5,260,402 | 11/1993 | Weitemeyer et al. .............. 528/29 |
| 5,391,679 | 2/1995 | Burkhart et al. .................. 528/27 |

FOREIGN PATENT DOCUMENTS

| | | |
|---|---|---|
| 0449050 | 10/1991 | European Pat. Off. . |
| 0462389 | 12/1991 | European Pat. Off. . |
| 0545002 | 6/1993 | European Pat. Off. . |
| 1165028 | 3/1964 | Germany . |
| 4239054 | 5/1994 | Germany . |

OTHER PUBLICATIONS

International Standard, ISO, 4628/5, pp. 1 to 4 (1982).
International Standard ISO, 4628/2, pp. 1–5, (1982).
International Standard ISO, 4628/3, pp. 1–7, (1982).
International Standard ISO, 4628/4, pp. 1–4 (1982).
W. Spratte, et al., Paint India, pp. 17–23 (1992).
W. Noll, "Chemieund Technologie der Silicones", Section 7.4.4., pp. 321–323, Verlag Chemie, Weinheim (1968).
International Standard ISO, 4628/1, pp. 1 and 2, (1982).

*Primary Examiner*—Ralph H. Dean
*Attorney, Agent, or Firm*—Sprung Horn Kramer & Woods

[57] ABSTRACT

The present invention relates to novel polysiloxane-polyether-based copolymers which contain T units and comprise randomly linked organopolysiloxane units and linear polyether units, to a method for their preparation and their use.

9 Claims, No Drawings

BRANCHED POLYSILOXANE-POLYETHER-BASED COPOLYMERS, THEIR PREPARATION AND USE

The present invention relates to polysiloxane-polyether-based copolymers which contain T units and consist of randomly linked organopolysiloxane units and linear polyether units, to a method for their preparation and to their use.

A multiplicity of copolymers comprising polysiloxanes and polyethers is known. These copolymers are mainly distinguished by their wide range of applications. In this respect, the suitability of a copolymer for a particular use essentially depends on the structure of the polysiloxane segment and the polyether segment, their ratio to each other, the type of linkage between the polysiloxane and the polyether chain, i.e. linkage via an oxygen atom or a carbon atom of the polymer, and on their mutual arrangement. Moreover the use of these copolymers depends on the reactive sites which are optionally still present in the copolymer, such as functional SiH groups or C=C double bonds, for example.

As is known, polysiloxane-polyether copolymers can be prepared by the reaction of polyethers with polysiloxanes containing SiH groups using a Pt catalyst. When polyethers with terminal OH groups are used an Si—O bond is formed, and when polyethers containing alkenyl groups are used an Si—C bond is formed (DE-A 1,165,028 and W. Noll "Chemie und Technologie der Silicones" ["*Chemistry and Technology of the Silicones*"], Verlag Chemie, Section 7.4.4, page 321 et seq.). Another possible method of synthesis is the reaction of a substituted siloxane, which may contain halogen, alkoxy or acetoxy groups as substituents for example, with polyethers containing functional OH groups (see DE-A 3,637,155, EP-A-25,822).

However, polysiloxane-polyether copolymers which possess both SiO and SiC bonds, the polysiloxane units of which are bonded via polyether units, and which in addition may be branched, have hitherto not been specifically prepared.

In general, copolymers comprising polysiloxanes and polyethers rank as some of the most effective lacquer additives. In this respect block copolymers are mostly used which are synthesized from methyl- and/or phenyl siloxanes and polyethers of ethylene- and/or propylene oxide. A survey of silicone-based paint and lacquer additives is given, for example, in the article by W. Spratte et al., Paint India, December 1992, pages 17 to 23, or in Walter Noll "Chemie und Technologie der Silicones", Verlag Chemie, Section 7.4.4, Copolymers with Polyethers, page 321 et seq.

Although silicone-based lacquer additives have found such a broad application in the production of lacquers and other coatings, their effectiveness is often insufficient to enable the desired properties of lacquers and other coatings to be obtained, e.g. as regards flow, surface properties and gloss. There is therefore a need for new, improved lacquer additives.

The object of the present invention is the preparation of new types of polysiloxane-polyether-based copolymers, which not only possess improved properties as lacquer additives but which can also be used in a wide variety of different fields, depending on their reactivity, their viscosity, and also on their content of functional SiH groups.

The present invention relates to polysiloxane-polyether-based copolymers which contain T units and consist of randomly linked organopolysiloxane units and linear polyether units, wherein the organopolysiloxane and polyether units are linked via Si—O—C or Si—C bonds and the organopolysiloxane chains are linked to each other via polyether units and the organopolysiloxane units are linked to each other with the formation of at least one T unit, wherein the ratio of T units to total siloxy units is 0.02 to 0.25, and the ratio of the number of polyether units to organopolysiloxane units is 0.07 to 0.33, preferably 0.10 to 0.30, most preferably 0.14 to 0.25, and the maximum number of silicone units per total molecule is 50.

The molar proportion of T units to total siloxy units is preferably 0.02 to 0.25. The weight ratio of polyethers to the total molecule is preferably 0.45 to 0.85, most preferably 0.6 to 0.7. The maximum number of siloxane units per total molecule is preferably 50.

In the sense of the present invention, a T unit is understood to be a trifunctional siloxane group

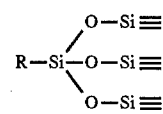

and T* is understood to mean a trifunctional siloxane group

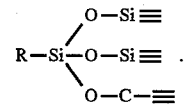

In the organopolysiloxane-polyether copolymers according to the invention, the following linkages are therefore effected:

linear organopolysiloxane units to each other with the formation of T units and via polyether units with the formation of T* units, and organopolysiloxane and polyether units via Si—O—C and/or Si—C bonds, preferably at "lateral" siloxane units, i.e. siloxane units which are incorporated in the chain and which are not terminal units.

In the copolymers according to the invention, the polysiloxane-polyether-based copolymer is preferably a copolymer of formula (I):

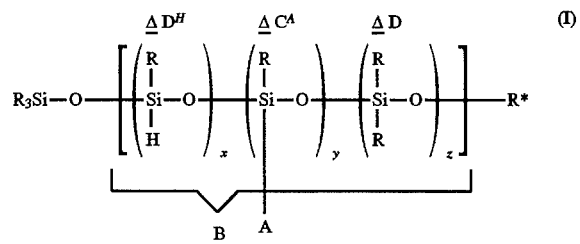

where R=alkyl radicals with 1 to 18 carbon atoms, preferably 1–4 carbon atoms, most preferably methyl, or saturated or unsaturated $C_5$–$C_6$ ring systems or aromatic radicals, most preferably phenyl, wherein R may differ within the siloxane chain [B], where $R^*=SiR_3$, $—(CH_2)_n[O(CH_2)_n]_m—O(CH_2)_n—R^1$ and/or $—(CH_2)_n[O(CH_2)_n]_m—O(CH_2)_{n-2}—CH=CH_2$ for x=0 where $R^1=$—H, —OH,

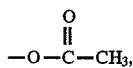

where $A=(CH_2)_n[O(CH_2)_n]_mO(CH_2)_n$—$R^1$ $C^A$ $\underline{A}$ $D^*$
and/or $=$—$O(CH_2)_n[O(CH_2)_n]_m$—$OR^2$ $C^A$ $\underline{A}$ $T^*$
where $R^2=$—$(CH_2)_n$—$R^1$
and/or $=R^2=$—$(CH_2)_{n-2}$—$CH=CH_2$
  when x=0
and/or =

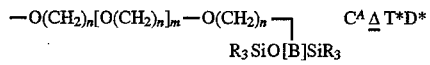

and/or =

where n=2, 3 and/or 4,
where
  x=0 to 9
  y=0 to 17
  z=0 to 50 with x+y+z≠0
and m=4–200, wherein the values for [B]

and

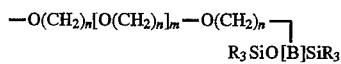

may be the same or different within a chain.

In the polyethers according to the invention, the polyether units are preferably mixed polymers of ethylene oxide and propylene oxide. The ratio of propylene oxide units to the total number of ethylene oxide and propylene oxide units is preferably 0–0.5.

The free OH functional groups of the polysiloxane-polyether can react with the common aliphatic and/or aromatic isocyanates.

The compounds are present in the form of a mixture with a distribution which is substantially controlled by the laws of statistics. The values of m, x, y and z therefore represent average values.

In one embodiment of the present invention the organopolysiloxanes preferably contain free SiH groups. The weight ratio of polyethers to the total molecule is preferably 0.45 to 0.85, most preferably 0.6 to 0.7. The maximum total number of siloxane units per molecule is preferably 50.

The organopolysiloxanes may already contain T units. The molar proportion of T units to total siloxy units is preferably 0.02 to 0.25.

The linear polyether units used in the copolymers according to the invention preferably contain either terminal OH and alkyl or alkenyl groups and/or contain terminal OH groups at both ends.

Preparation of the copolymers according to the invention is only accomplished successfully by linking organopolysiloxane units via polyether units (T*) and/or by the subsequent incorporation of T units in linear organopolysiloxane-polyether block polymers, an existing S—O-polysiloxane bond being cleaved in favor of an Si—O—Si bond in the latter situation.

The present invention also relates to a method of preparing polysiloxane-polyether-based copolymers, in which organopolysiloxanes containing functional SiH groups are reacted with linear polyethers containing alkenyl groups and with terminal OH groups in the presence of strong bases, and the reaction is optionally terminated by neutralization.

Bases are preferably used in the method according to the invention which have a $pK_b$ value <0 and a solubility of at least 1000 ppm in the reaction mixture. $NaOCH_3$ is particularly preferred as the base.

The following reactions are important in the preparation of the polymers according to the invention:

1) Addition of a polyether to the siloxane unit with the formation of an Si—C— polyether bond (D*)

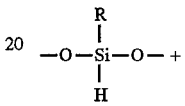

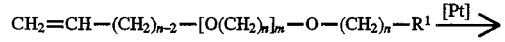

where $R=C_1$–$C_{18}$ alkyl radicals, preferably $C_1$–$C_4$ alkyl radicals, most preferably methyl, or saturated or unsaturated $C_5$–$C_6$ ring systems or aromatic radicals, most preferably phenyl, and
$R^1=$—H, —OH ,

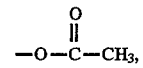

2) Formation of an Si—O-polyether bond (T*)

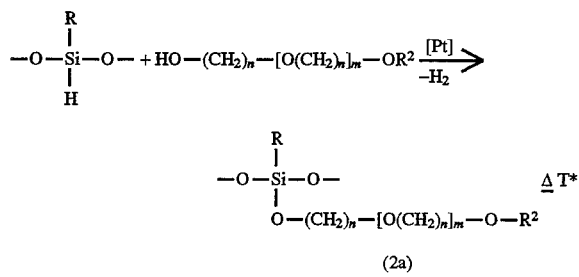

where $R^2=$—$(CH_2)_n$—OH, —$(CH_2)_{n-2}$—$CH=CH_2$.

3) The linking of two polysiloxane units via a polyether unit (D*T* or T*T*)

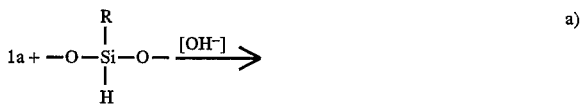

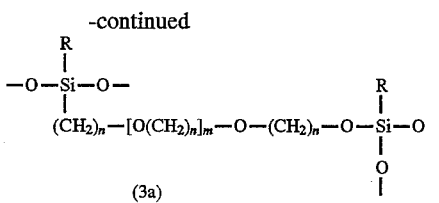

(3a)

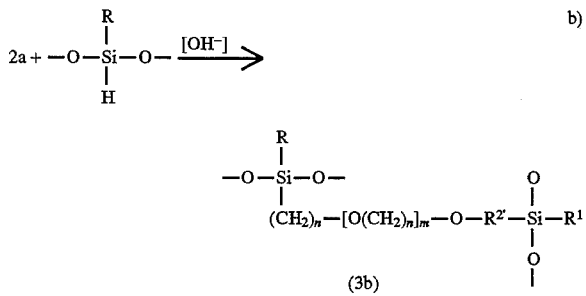

(3b)

where $R^{2'} = -(CH_2)_aO-$, $-(CH_2)_{n-2}-CH_2-CH_2-$ $-(CH_2)_{n-2}-\underset{\underset{CH_3}{|}}{CH}-$ 4) Formation of an Si—O—Si bond (T) with cleavage of an Si—O-polyether bond

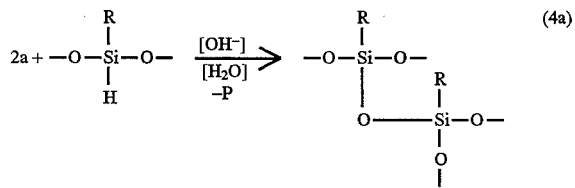

(4a)

where [OH⁻]=strong base, e.g. NaOMe₃
and P=HO—$(CH_2)_n$—$[O(CH_2)_n]_m$—$OR^2$.

Within the scope of the method according to the invention, the reaction is either conducted until all the SiH groups in the polysiloxane-polyether copolymer have been completely removed, or the reaction is stopped by neutralization, preferably by the addition of acetic acid, when the desired viscosity has been reached.

Functional groups may optionally be introduced subsequently into the polymers, by acetylation or by reaction with isocyanates.

The present invention also relates to the use of the polymers according to the invention, preferably as additives for solvent-containing and solvent-free lacquers, paints, pastes, mortars, coatings and other preparations, for the coating of textiles in the textile industry, as starting materials for crosslinking reactions, e.g. for resins and elastomers, as foam stabilizers, as antifoaming agents, and/or as emulsion stabilizers.

The selection of the educts and the ratio of polysiloxane to polyether, as well as the number of reactive groups in the polysiloxane, is made according to the preferred use.

The use of the copolymers according to the invention in solvent-containing, solvent-free and aqueous lacquers is preferred.

In this manner it is possible to prepare a polysiloxane-polyether which is custom-made for a particular field of application.

If organopolysiloxane-polyether copolymers are used which contain SiH groups in excess of the number which is necessary for the introduction of the T units, these low-viscosity copolymers are suitable for use in the textile industry due to their properties of adhesion to textiles, or are suitable as components in addition polymerization reactions for the preparation of copolymers of higher viscosity.

SiH-free polysiloxane-polyether copolymers with a number of polysiloxane units up to 50 are particularly suitable as additives for solvent-containing and also solvent-free lacquers, paints, pastes, mortars and coatings, particularly for improving surface and flow properties and gloss.

For these applications the organopolysiloxane-polyether mixtures according to the invention may be used both undiluted and in diluted form. However, diluted formulations are preferably used, which contain water or solvent or mixtures thereof in addition to the compounds according to the invention. The following solvents should be mentioned: butyl diglycol, isopropanol, methoxypropyl acetate, ethylene- or propylene glycol, butyl acetate, xylene, higher-boiling aromatic, aliphatic and/or aromatic/aliphatic crude oil distillation fractions, etc. The ready-for-use preparations of the compounds according to the invention then constitute 0.1% to 90% solutions, preferably 1% to 50% solutions.

The organopolysiloxane-polyether copolymers according to the invention can be added in any amounts, but are preferably used in amounts of 0.01 to 5 weight %, preferably 0.05 to 2 weight %, based on the weight of the ready-for-use coating medium.

SiH-containing polysiloxane-polyether copolymers are also suitable as agents in crosslinking reactions, e.g. for resins and elastomers.

Examples of other fields of application for the copolymers according to the invention include their use as foam stabilizers, for example for polyurethane (PU) foamed materials, their use as an antifoaming agents, particularly in aqueous systems, their use as emulsion stabilizers, e.g. for cosmetic preparations.

The present invention is further described in the following illustrative examples. The gloss measurements in the examples were made according to DIN 67 530 (=ISO 2813) and the haze value determination was made according to DIN 67 530 (=ISO 2813).

EXAMPLES

Preparation Conditions 1

Preparation of Polyethers

Preparation of Polyethers Starting From Allyl Compounds (Examples 1–7, B1 and B2)

432.7 g 2-propenol (allyl alcohol) was used. After flushing thoroughly with nitrogen and the addition of 10 g aqueous KOH (50%), 2596 g propylene oxide were added at 110°–120° C., and 1968.9 g ethylene oxide were subsequently added at 105°–110° C., both additions being made under a nitrogen pressure of 2 bar, without the removal of water. The reaction mixture was then allowed to react for about 4 hours. The reaction mixture was then neutralized with sulphuric acid and was stabilized with 2.5 g (0.05%) of Ionol (2,6-di-tert.-butyl-4-methylphenol). After removing the water the product was filtered and heated for 5 hours at 110° C. and <6 mbar.

TABLE 1

Summary of the amounts of educts used in the other Examples:

| Example | Allyl alcohol [g] | KOH [g] (50% in $H_2O$) | Propylene oxide [g] | Ethylene oxide [g] | Ionol [g] |
|---|---|---|---|---|---|
| 1–7, B1, B2 | 432.7 | 10.0 | 2596.0 | 1968.9 | 2.5 |
| 8 | 309.1 | 10.0 | — | 4688.4 | 2.5 |
| 9 | 582.2 | 10.0 | — | 4415.3 | 2.5 |
| 10–14 | 336.3 | 10.0 | 1345.3 | 3315.4 | 2.5 |

General Preparation Conditions for Polyethers Starting From Butyl Compounds
(Example 15)

1253.5 g diethylene glycol monobutyl ether were used. After the addition of 10 g aqueous KOH (50%), water was removed and nitrogen was employed as an inert atmosphere. 3744.4 g ethylene oxide were added at 105°–110° C. under a nitrogen pressure of 2 bar. The reaction mixture was allowed to react for about 4 hours. The reaction mixture was then neutralized with sulphuric acid and was stabilized with 2.5 g (0.05%) of Ionol. After removing the water the product was filtered and heated for 5 hours at 110° C. and <6 mbar.

TABLE 1a

Summary of the polyethers prepared according to preparation conditions 1.

| Example No. | Polyether |
|---|---|
| 1–7, B1, B2 | $CH_2=CH-CH_2O(C_3H_6O)_4(C_2H_4O)_6H$ |
| 8 | $CH_2=CH-CH_2O(C_2H_4O)_{20}H$ |
| 9 | $CH_2=CH-CH_2O(C_2H_4O)_{10}H$ |
| 10–14 | $CH_2=CH-CH_2O(C_3H_6O)_4(C_2H_4O)_{13}H$ |
| 15 | $C_4H_9O-(C_2H_4O)_{13}H$ |

The amounts used, which are given in Table 2 on page 18, were reacted under the following preparation conditions:

Preparation Conditions 2

(Preliminary stage for compounds 1 to 13 and for comparative examples B 1 and B2)
Preparation of a Linear SiH Oil After weighing in the amounts of reagents shown in Table 2, octamethyl cyclotetrasiloxane ($D_4$), hexamethyl disiloxane ($M_2$) and Baysilone Oil MH 15 (trimethylsilyl-terminated methyl hydrogen polysiloxane with an average of 30 methyl hydrogen siloxy units) were equilibrated in known manner under acid catalysis conditions.

The catalyst was neutralized and separated as its salt by filtration.

The products not containing functional SiH groups were distilled off after filtration.

Preparation Conditions 3

(Second stage or preliminary stage 2 for compounds 1 to 13 and for comparative example B2)
Preparation of the Polyether Siloxane
(See Table 2 for amounts weighed in)

Depending on the compound, about 0.2 moles of a polyether prepared from allyl alcohol as the starting material and containing functional OH groups were mixed with a Pt catalyst (50 ppm Pt based on the total batch) and reacted at 80° to 130° C. with 0.3 moles SiH of the SiH oil prepared according to preparation conditions 2. After the addition reaction the remaining SiH was reacted with the OH groups of the polyether at room temperature by the addition of 1000 ppm $NaOCH_3$.

After the product was free from SiH, it was neutralized with acetic acid.

The composition of the compounds corresponding to Examples 2 and 5 was determined by evaluating their $^{29}Si$ and $^1H$ NMR spectra (see Table 3).

Preparation Conditions 4

(For compounds 1 to 13 and for comparative example B2)
Acetylation of the polyether-polysiloxane The product obtained according to preparation conditions 3 was esterified with acetic anhydride, with the addition of 0.5% phosphoric acid. Acetic acid and the non-functional siloxanes which were still present were removed by heating under vacuum The product was neutralized and filtered. The composition of the product was determined by evaluating its $^{29}Si$ and $^1H$ NMR spectra (see Table 3).

Preparation Conditions 5

(Formulated for Example 9)

0.30 moles of a polyether (from Table 1b) prepared from allyl alcohol as the starting material and containing functional OH groups were mixed with a Pt catalyst (50 ppm Pt based on the total batch) and reacted at 80° to 130° C. with 0.3 moles SiH equivalent of the SiH oil prepared according to preparation conditions 2, Example 3. After this reaction 1000 ppm sodium methylate were added and 0.3 moles SiH of an SiH oil obtained according to preparation conditions 2, Example 3 were added. After a reaction period of 3 hours at 130° C. the mixture was neutralized with HOAc, heated and filtered.

The composition of the product was determined by evaluating its $^{29}Si$ and $^1H$ NMR spectra (see Table 3).

Preparation Conditions 6

(Formulated for Example 14)

157.0 g (0.97 moles) hexamethyl disiloxane, 59.6 g (0.40 moles) methyl trichlorosilane and 148.3 g (0.50 moles) octamethyl cyclotetrasiloxane were dissolved in 300 g xylene and hydrolyzed with 16.2 g (0.90 moles) $H_2O$ under acid equilibration conditions. After the hydrolysis, 65.4 g (0.03 moles) Baysilone Oil MH 15 (see preparation conditions 2) were introduced and equilibrated. The catalyst was neutralized and removed as its salt by filtration. The solution of this branched silicone oil was reacted according to preparation conditions 3 with 1 mole of the polyether, acetylated with acetic anhydride/0.5% phosphoric acid using a Pt catalyst (50 ppm Pt based on the total batch).

The composition of the product was determined by evaluating its $^{29}Si$ and $^1H$ NMR spectra (see Table 3).

Preparation Conditions 7

(Formulated for Example 15)

162.4 g (1 mole) hexamethyl disiloxane, 59.6 g (0.40 moles) methyl trichlorosilane and 222.4 g (0.75 moles) octamethyl cyclotetrasiloxane were hydrolyzed with 1.8 g (0.1 moles) $H_2O$ and 74.4 g (1.24 moles) acetic acid under acid equilibration conditions. After the hydrolysis, the reaction mixture was mixed with 500 g xylene and 995 g (1.10 moles) of a polyether (OH number 62, based on ethylene oxide) prepared from butanol as the starting material. The desired reaction to form the Si—O—C-bonded polyether was carried out by introducing $NH_3$ at 40° C. until saturation was obtained. After the reaction the mixture was filtered, heated and the product was diluted with butanol while still hot.

The composition of the product was determined by evaluating its $^{29}$Si and $^1$H NMR spectra (see Table 3).

Preparation Conditions 8

(Comparative Conditions (VV))

(Comparative Example B 1)

0.34 moles of a polyether from Table 1 a, prepared from an allyl starting material and with an OH number of 112, were acetylated with a 10% excess of acetic anhydride with the addition of 0.5% $H_3PO_4$ as a catalyst. Acetic acid and excess acetic anhydride were removed by distillation and the phosphoric acid was neutralized. The salt and excess neutralizing agent were separated by filtration.

The OH-free polyether obtained was reacted in the customary manner with 0.30 moles SiH equivalent of the SiH oil prepared according to preparation conditions 2, Example 3, with addition to the double bond. The non-functional siloxanes were removed by distillation and the product was filtered.

The composition of the product was determined by evaluating its $^{29}$Si and $^1$H NMR spectra (see Table 3).

$R=CH_3$, $R^*=$—$SIR_3$, with the exception of Example 15, where $R^*=54\%$ $SiR_3$ and 46% —O—$(C_2H_4O)_{13}C_4H_9$.

The remaining data on y, z and A is given in Table 3.

TALBE 2

| | | Amounts used in the examples and comparative examples | | | | | | |
|---|---|---|---|---|---|---|---|---|
| | Prepared by a combination of preparation | Amounts used (g) for 1000 g total batch weight | | | Amount of polyether based on 0.3 moles SiH | | Amount of acetic anhydride used | |
| Example | conditions (VV = comparative conditions) | $M_2$ | MH 15 | $D_4$ | (moles) | (g) | (moles) | (g) |
| 1 | 1,2,3,4 | 610.81 | 383.19 | 0.00 | 0.209 | 104.79 | 0.230 | 23.46 |
| 2 | 1,2,3 | 352.77 | 147.27 | 499.86 | 0.267 | 133.99 | — | — |
| 3 | 1,2,3,4 | 423.32 | 176.72 | 399.96 | 0.228 | 114.21 | 0.250 | 25.57 |
| 4 | 1,2,3,4 | 302.38 | 126.23 | 571.38 | 0.271 | 135.85 | 0.298 | 30.42 |
| 5 | 1,2,3 | 261.65 | 226.26 | 512.08 | 0.214 | 107.49 | — | — |
| 6 | 1,2,3,4 | 423.32 | 176.72 | 399.96 | 0.240 | 120.54 | 0.264 | 26.99 |
| 7 | 1,2,3,4 | 423.32 | 176.72 | 399.96 | 0.244 | 122.31 | 0.268 | 27.39 |
| 8 | 1,2,3,4 | 423.32 | 176.72 | 399.96 | 0.234 | 203.82 | 0.257 | 26.28 |
| 9 | 1,2,5 | 423.32 | 176.72 | 399.96 | 0.300 | 150.48 | — | — |
| 10 | 1,2,3,4 | 264.59 | 110.46 | 624.96 | 0.241 | 120.98 | 0.265 | 27.09 |
| 11 | 1,2,3,4 | 302.38 | 126.23 | 571.38 | 0.233 | 116.74 | 0.256 | 26.14 |
| 12 | 1,2,3,4 | 352.77 | 147.27 | 499.96 | 0.210 | 105.23 | 0.231 | 23.56 |
| 13 | 1,2,3,4 | 423.32 | 176.72 | 339.96 | 0.233 | 116.79 | 0.256 | 26.15 |
| Comparative examples | | | | | | | | |
| B1 | 1,2,VV | 264.59 | 110.46 | 624.96 | 0.341 | 171.05 | 0.375 | 38.29 |
| B2 | 1,2,3,4 | 423.32 | 176.72 | 399.96 | 0.284 | 142.25 | 0.312 | 31.85 |

* $M_2$ = hexamethyl disiloxane, MH 15 = Baysilone Oil MH 15, $D_4$ = octamethyl cyclotetrasiloxane
The amounts of compounds 14 and 15 used can be taken directly from preparation conditions 6 and 7, respectively.

The following abbreviations are used in the summary of product compositions given in Table 3:

$$R_3Si-O-\underbrace{\left[\left(\begin{array}{c}R\\|\\Si-O\\|\\H\end{array}\right)_x\underbrace{\left(\begin{array}{c}R\\|\\Si-O\\|\\A\end{array}\right)_y}_{}\left(\begin{array}{c}R\\|\\Si-O\\|\\R\end{array}\right)_z\right]}_{B}-R^*$$

where

TABLE 3

Composition of products in the Examples (Nos. 1 to 15) and Comparative Examples (B1 and B2) [B] = trivalent radical

| Example No. | y | z | A | |
|---|---|---|---|---|
| 1 | 1.91 | 0 | 0.58 | $-(CH_2)_3O(C_3H_6O)_4(C_2H_4O)_6-[B][SiR_3][OSiR_3]$ |
|   |      |   | 0.58 | $-O-(C_2H_4O)_6(C_3H_6O)_4(CH_2)_3[B][SiR_3][OSiR_3]$ |
|   |      |   | 0.75 | $-(CH_2)_3O(C_3H_6O)_4(C_2H_4O)_6-Ac$ |
| 2 | 1.46 | 4.30 | 0.16 | $-(CH_2)_3-O(C_3H_6O)_4(C_2H_4O)_6-[B][SiR_3][OSiR_3]$ |
|   |      |      | 0.16 | $-O-(C_2H_4O)_6(C_3H_6O)_4(CH_2)_3-[B][SiR_3][OSiR_3]$ |
|   |      |      | 1.14 | $-(CH_2)_3O(C_3H_6O)_4(C_2H_4O)_6H$ |
| 3 | 2.24 | 2.90 | 0.54 | $-(CH_2)_3-O(C_3H_6O)_4(C_2H_4O)_6-[B][SiR_3][OSiR_3]$ |
|   |      |      | 0.54 | $-O-(C_2H_4O)_6(C_3H_6O)_4(CH_2)_3-[B][SiR_3][OSiR_{3}]$ |
|   |      |      | 1.16 | $-(CH_2)_3-O(C_3H_6O)_4(C_2H_4O)_6-Ac$ |
| 4 | 1.44 | 2.80 | 0.14 | $-(CH_2)_3-O(C_3H_6O)_4(C_2H_4O)_6-[B][SiR_3][OSiR_3]$ |
|   |      |      | 0.14 | $-O-(C_2H_4O)_6(C_3H_6O)_4(CH_2)_3-[B][SiR_3][OSiR_3]$ |
|   |      |      | 1.16 | $-(CH_2)_3-O(C_3H_6O)_4(C_2H_4O)_6-Ac$ |
| 5 | 2.66 | 5.40 | 0.76 | $-(CH_2)_3-O(C_3H_6O)_4(C_2H_4O)_6-[B][SiR_3][OSiR_3]$ |
|   |      |      | 0.76 | $-O-(C_2H_4O)_6(C_3H_6O)_4(CH_2)_3-[B][SiR_3][OSiR_3]$ |
|   |      |      | 1.14 | $-(CH_2)_3O(C_3H_6O)_4(C_2H_4O)_6H$ |
| 6 | 1.91 | 2.62 | 0.38 | $-(CH_2)_3-O(C_3H_6O)_4(C_2H_4O)_6-[B][SiR_3][OSiR_3]$ |
|   |      |      | 0.38 | $-O-(C2H_4O)_6(C_3H_6O)_4(CH_2)_3-[B][SiR_3][OSiR_3]$ |
|   |      |      | 1.15 | $-(CH_2)_3-O(C_3H_6O)_4(C_2H_4O)_6-Ac$ |
| 7 | 2.03 | 2.64 | 0.38 | $-(CH_2)_3-O(C_3H_6O)_4(C_2H_4O)_6-[B][SiR_3][OSiR_3]$ |
|   |      |      | 0.38 | $-O-(C_2H_4O)_6(C_3H_6O)_4(CH_2)_3-[B][SiR_3][OSiR_3]$ |
|   |      |      | 1.27 | $-(CH_2)_3-O(C_3H_6O)_4(C_2H_4O)_6-Ac$ |
| 8 | 2.00 | 2.90 | 0.44 | $-(CH_2)_3O(C_2H_4O)_{20}[B][SiR_3][OSiR_3]$ |
|   |      |      | 0.44 | $-O(C_2H_4)_{20}-(CH_2)_3-[B][SiR_3][OSiR_3]$ |
|   |      |      | 2.46 | $-(CH_2)_3O(C_2H_4O)_{20}Ac$ |
| 9 | 2.10 | 2.34 | 0.75 | $-(CH_2)_3O(C_2H_4O)_{10}[B][SiR_3][OSiR_3]$ |
|   |      |      | 0.75 | $-O(C_2H_4O)_{10}(CH_2)_3-[B][SiR_3][OSiR_3]$ |
|   |      |      | 0.60 | $-O-[B][SiR_3][OSiR_3]$ |
| 10 | 1.53 | 5.12 | 0.30 | $(CH_2)_3O(C_3H_6O)_4(C_2H_4O)_{13}-[B][SiR_3][OSiR_3]$ |
|    |      |      | 0.30 | $-O-(C_2H_4O)_{13}(C_3H_6O)_4-(CH_2)_3-[B][SiR_3][OSiR_3]$ |
|    |      |      | 0.93 | $-(CH_2)_3O(C_3H_6O)_4(C_2H_4O)_{13}Ac$ |
| 11 | 1.65 | 4.24 | 0.37 | $-(CH_2)_3-O-(C_3H_6O)_4(C_2H_4O)_{13}-[B]-[SiR_3][OSiR_3]$ |
|    |      |      | 0.37 | $-O-(C_2H_4O)_{13}(C_3H_6O)_4(CH_2)_3-[B]-[SiR_3][OSiR_3]$ |
|    |      |      | 0.91 | $-(CH_2)_3-O(C_3H_6O)_4(C_2H_4O)_6-Ac$ |
| 12 | 1.43 | 3.36 | 0.43 | $-(CH_2)_3-O-(C_3H_6O)_4(C_2H_4O)_{13}-[B][SiR_3][OSiR_3]$ |
|    |      |      | 0.43 | $-O-(C_2H_4O)_{13}(C_3H_6O)_4(CH_2)_3-[B][SiR_3][OSiR_3]$ |
|    |      |      | 0.57 | $-(CH_2)_3-O(C_3H_6O)_4(C_2H_4O)_6-Ac$ |
| 13 | 2.01 | 2.48 | 0.45 | $-(CH_2)_3-O-(C_3H_6O)_4(C_2H_4O)_{13}-[B][SiR_3][OSiR_3]$ |
|    |      |      | 0.45 | $-O-(C_2H_4O)_{13}(C_3H_6O)_4(CH_2)_3-[B]-[SiR_3][OSiR_3]$ |
|    |      |      | 1.11 | $-(CH_2)_3-O(C_3H_6O)_4(C_2H_4O)_6-Ac$ |
| 14 | 1.45 | 2.18 | 0.67 | $-O-[B][SiR_3][OSiR_3]$ |
|    |      |      | 0.78 | $-(CH_2)_3-O(C_3H_6O)_4(C_2H_4O)_6-Ac$ |
| 15 | 0.31 | 2.31 |      | $-O-(C_2H_4O)_{13}C_4H_9$ |
| B1 | 1.70 | 7.40 |      | $-(CH_2)_3-O(C_3H_6O)_4(C_2H_4O)_6-Ac$ |
| B2 | 2.01 | 3.00 | 0.11 | $-(CH_2)_3-O(C_3H_6O)_4(C_2H_4O)_6-[B][SiR_3][OSiR_3]$ |
|    |      |      | 0.11 | $-O-(C_2H_4O)_6(C_3H_6)_4(CH_2)_3-[B][SiR_3][OSiR_3]$ |
|    |      |      | 1.79 | $-(CH_2)_3-O(C_3H_6O)_4(C_2H_4O)_6-Ac$ |

Ac = acetyl radical $\underline{\underline{\Delta}}$ $-\underset{\underset{O}{\|}}{C}-CH_3$ In order to assess the effectiveness of the organopolysiloxane-polyethers according to the invention, these copolymers which were prepared were tested for their suitability as additives for lacquers, under the following test conditions.

Test Conditions for Clear Lacquers

Suitable glass plates were coated with commercially available base lacquer. Covering lacquers of the compositions given below, mixed with compounds according to the invention, were sprayed on to these plates.

The top half of the plates was blown with compressed air in order to check the draught sensitivity.

| Formulation 1 | |
|---|---|
| Macrynal ® SM 510, a polyacrylate with functional OH groups manufactured by Hoechst (60% in xylene), | 108.4 parts by weight |
| Butyl acetate | 75.1 parts by weight |
| Methoxypropyl acetate | 38.0 parts by weight |
| Zinc octoate (metal content 1.2%) | 1.6 parts by weight |
| Desmodur ® N75: a polyisocyanate manufactured | 46.8 parts by weight | by Bayer AG
Formulation 2

| | |
|---|---|
| Desmophen ® 670, a slightly branched polyester containing hydroxyl groups manufactured by Bayer AG (80% in butyl acetate) | 82.7 parts by weight |
| Xylene | 4.1 parts by weight |
| Butyl acetate | 14.9 parts by weight |
| Methoxypropyl acetate | 30.2 parts by weight |
| Zinc octoate (metal content 1.2%) | 1.1 parts by weight |
| Butyl acetate/xylene (94:6) | 60.8 parts by weight |
| Desmodur ® N75: a polyisocyanate manufactured by Bayer AG | 45.1 parts by weight |

Formulation 3

| | |
|---|---|
| Bayhydrol ® LS 2065, aqueous polyurethane dispersion with functional OH groups manufactured by Bayer AG | 61.7 parts by weight |
| Cymel ® 352, a melamine resin manufactured by Cyanamid | 14.9 parts by weight |
| Ethyl diglycol | 1.1 parts by weight |
| Tinuvin ® 1130, a light stabilizer manufactured by Ciba Geigy, 50% in ethyl glycol | 1.6 parts by weight |
| Tinuvin ® 292, a light stabilizer manufactured by Ciba Geigy, 50% in ethyl glycol | 0.8 parts by weight |
| Water | 19.6 parts by weight |

Formulation 4

| | |
|---|---|
| Bayhydrol ® LS 2017, a polyester-polyurethane dispersion manufactured by Bayer AG, | 64.9 parts by weight |
| Tinuvin ® 1130, a light stabilizer manufactured by Ciba Geigy, 20% in methoxypropyl acetate | 4.3 parts by weight |
| Tinuvin ® 292, a light stabilizer manufactured by Ciba Geigy, 20% in methoxypropyl acetate | 2.1 parts by weight |
| Water | 2.1 parts by weight |
| Desmodur LS ® 2032, a polyisocyanate manufactured by Bayer AG | 15.6 parts by weight |

Test Conditions for Pigmented Clear Lacquers

Covering lacquers of the following compositions, mixed with compounds according to the invention, were applied to cleaned steel or glass plates:

Formulation 5

| | | |
|---|---|---|
| 1. | Mill batch | |
| | Bayhydrol ® LS 2017, a polyester-polyurethane dispersion manufactured by Bayer AG | 14.29 parts by weight |
| | Dimethyl ethanolamine (DMEA) 10% $H_2O$ | 1.20 parts by weight |
| | Water | 4.51 parts by weight |
| | Bayertitan ® R-KB-4, a pigment manufactured by Bayer AG | 30.00 parts by weight |
| | - pre-dispersion using a dissolver | |
| | - pH value of 8.5 to 9.0 checked (adjusted if necessary with DMEA) | |
| | - milling in a bead mill to less than 5 µm | |
| 2. | Make-up batch for lacquer application Bayhydrol ® LS 2017, a polyether-polyurethane dispersion manufactured by Bayer AG | 35.71 parts by weight |
| | Cymel ® 327, a melamine resin manufactured by Cyanamid | 10.00 parts by weight |
| | Water | 4.04 parts by weight |

Formulation 6

| | | |
|---|---|---|
| - | Desmophen ® A 365, a polyacrylate containing hydroxyl groups, manufactured by Bayer AG (65% in 3:1 butyl acetate:xylene) | 32.32 parts by weight |
| - | Cellulose acetobutyrate (CAB 551-0.01) manufactured by Eastman-Kodak (10% in butyl acetate) | 0.63 parts by weight |
| - | Tinuvin ® 292, a light stabilizer manufactured by Ciba Geigy, 50% in xylene | 0.63 parts by weight |
| - | Diazabicyclooctane (Dabco ® LV-33) | 1.57 parts by weight |

-continued

| | | |
|---|---|---|
| | a catalyst manufactured by Biesterfeld (10% in butyl acetate) | |
| - | Bentone ® 38 (anti-settling agent) a montmorillonite manufactured by Kronos-Titan GmbH (10% suspension in Solvesso ® 100) | 2.20 parts by weight |
| - | Aerosil ® R972, a pyrogenic hydrated silica manufactured by Degussa | 0.16 parts by weight |
| - | Bayertitan ® R-KB-4, a pigment manufactured by Bayer AG | 25.11 parts by weight |
| - | Solubilizer mixture (2:2:1 xylene:butyl acetate:Solvesso ® 100) | 11.88 parts by weight |
| - | Desmodur ® N3390, a polyisocyanate manufactured by Bayer AG (90% in 1:1 butyl acetate:Solvesso ® 100) | 11.53 parts by weight |
| - | Solubilizer mixture (1:1 xylene:butyl acetate) | 13.47 parts by weight |

| Lacquer system formulation No. | Additive in Example No. | Tension* of blown part | Standard | 20° Gloss* | Haze value* | Visual assessment |
|---|---|---|---|---|---|---|
| 1 | 1 | 20 | 20 | 92 | 9 | 2–3 |
| 1 | 2 | 20 | 20 | 91 | 6 | 2 |
| 1 | 3 | 20 | 21 | 93 | 8 | 0 |
| 1 | 4 | 18 | 20 | 92 | 6 | 2 |
| 1 | 5 | 21 | 21 | 92 | 8 | 0–1 |
| 1 | 6 | 19 | 20 | 92 | 8 | 2 |
| 1 | 7 | 21 | 21 | 92 | 9 | 2 |
| 1 | 8 | | | | | 5 |
| 1 | 9 | 20 | 21 | 92 | 6 | 0 |
| 1 | 10 | 21 | 22 | 92 | 8 | 0 |
| 1 | 11 | 23 | 22 | 92 | 7 | 0 |
| 1 | 12 | 22 | 23 | 92 | 8 | 0 |
| 1 | 13 | 23 | 21 | 92 | 7 | 2 |
| 1 | 14 | 19 | 20 | 92 | 7 | 1–2 |
| 1 | 15 | 20 | 20 | 92 | 8 | 1 |
| | Comparative Examples | | | | | |
| 1 | B1 | 18 | 19 | 92 | 12 | 4 |
| 1 | B2 | 13 | 20 | 92 | 22 | 4 |
| 2 | 1 | 16 | 15 | 91 | 6 | 0–1 |
| 2 | 2 | 15 | 14 | 91 | 7 | 1 |
| 2 | 2 | 23 | 22 | 93 | 7 | 0–1 |
| 2 | 4 | 15 | 17 | 91 | 6 | 1 |
| 2 | 5 | 22 | 22 | 91 | 8 | 1 |
| 2 | 6 | 16 | 18 | 92 | 6 | 0–1 |
| 2 | 7 | 15 | 17 | 91 | 7 | 0–1 |
| 2 | 8 | 15 | 18 | 91 | 8 | 4 |
| 2 | 9 | 23 | 23 | 92 | 9 | 1 |
| 2 | 10 | 23 | 23 | 91 | 7 | 1 |
| 2 | 11 | 22 | 23 | 92 | 6 | 1 |
| 2 | 12 | 20 | 21 | 91 | 6 | 1 |
| 2 | 13 | 24 | 23 | 92 | 5 | 1–2 |
| 2 | 14 | 20 | 20 | 92 | 7 | 1 |
| 2 | 15 | 18 | 19 | 92 | 6 | 1 |
| | Comparative Examples | | | | | |
| 2 | B1 | 13 | 13 | 91 | 17 | 3 |
| 2 | B2 | 13 | 14 | 91 | 16 | 3 |
| 3 | 1 | 18 | 19 | 74 | 350 | 1 |
| 3 | 2 | 17 | 18 | 75 | 340 | 0–1 |
| 3 | 3 | 19 | 19 | 75 | 330 | 1 |
| 3 | 4 | 18 | 18 | 76 | 330 | 1 |
| 3 | 5 | 18 | 18 | 76 | 330 | 0–1 |
| 3 | 6 | 18 | 19 | 75 | 310 | 0–1 |
| 3 | 7 | 19 | 20 | 77 | 320 | 1 |
| 3 | 8 | 20 | 20 | 76 | 230 | 0–1 |
| 3 | 9 | 18 | 19 | 77 | 330 | 0–1 |
| 3 | 10 | 18 | 19 | 75 | 330 | 1 |
| 3 | 11 | 18 | 18 | 76 | 340 | 0 |
| 3 | 12 | 20 | 21 | 78 | 300 | 0 |
| 3 | 13 | 20 | 20 | 83 | 260 | 1 |
| 3 | 14 | 19 | 20 | 76 | 310 | 0–1 |
| 3 | 15 | 19 | 19 | 77 | 320 | 1 |
| | Comparative Examples | | | | | |
| 3 | B1 | 13 | 16 | 72 | 360 | 4 |

-continued

| Lacquer system formulation No. | Additive in Example No. | Tension* of blown part | Standard | 20° Gloss* | Haze value* | Visual assessment |
|---|---|---|---|---|---|---|
| 3 | B2 | 12 | 15 | 74 | 420 | 4 |
| 4 | 1 | 16 | 17 | 89 | 270 | 1 |
| 4 | 2 | 19 | 19 | 88 | 295 | 1 |
| 4 | 3 | 20 | 21 | 90 | 255 | 1 |
| 4 | 4 | 19 | 20 | 88 | 295 | 1 |
| 4 | 5 | 20 | 20 | 90 | 305 | 1 |
| 4 | 6 | 18 | 19 | 89 | 300 | 1 |
| 4 | 7 | 18 | 18 | 90 | 310 | 1 |
| 4 | 8 | 17 | 17 | 88 | 295 | 1 |
| 4 | 9 | 18 | 19 | 87 | 280 | 1 |
| 4 | 10 | 15 | 16 | 88 | 300 | 0–1 |
| 4 | 11 | 17 | 18 | 85 | 260 | 0–1 |
| 4 | 12 | 19 | 20 | 89 | 250 | 0–1 |
| 4 | 13 | 19 | 19 | 90 | 230 | 0–1 |
| 4 | 14 | 18 | 19 | 87 | 280 | 1 |
| 4 | 15 | 19 | 19 | 88 | 270 | 1 |
| | Comparative Examples | | | | | |
| 4 | B1 | 14 | 14 | 86 | 470 | 4 |
| 4 | B1 | 12 | 15 | 85 | 510 | 4 |
| 5 | 1 | 21 | 22 | 75 | 36 | 0–1 |
| 5 | 2 | 22 | 23 | 76 | 35 | 0–1 |
| 5 | 3 | 24 | 24 | 75 | 38 | 0–1 |
| 5 | 4 | 23 | 23 | 74 | 34 | 0–1 |
| 5 | 5 | 21 | 22 | 75 | 33 | 0–1 |
| 5 | 6 | 22 | 23 | 76 | 36 | 0–1 |
| 5 | 7 | 22 | 22 | 77 | 37 | 0–1 |
| 5 | 8 | 22 | 22 | 79 | 33 | 1 |
| 5 | 9 | 22 | 23 | 80 | 32 | 1 |
| 5 | 10 | 22 | 23 | 80 | 31 | 0–1 |
| 5 | 11 | 23 | 24 | 75 | 35 | 1 |
| 5 | 12 | 24 | 24 | 78 | 30 | 0–1 |
| 5 | 13 | 24 | 24 | 77 | 30 | 0–1 |
| 5 | 14 | 22 | 23 | 76 | 32 | 0–1 |
| 5 | 15 | 23 | 23 | 77 | 33 | 1 |
| | Comparative Example | | | | | |
| 5 | B1 | 15 | 18 | 75 | 54 | 3 |
| 5 | B2 | 14 | 16 | 72 | 76 | 3 |
| 6 | 1 | 22 | 24 | 86 | 17 | 1–2 |
| 6 | 2 | 21 | 23 | 85 | 20 | 1–2 |
| 6 | 3 | 22 | 23 | 86 | 19 | 1 |
| 6 | 4 | 20 | 23 | 86 | 20 | 1–2 |
| 6 | 5 | 20 | 23 | 85 | 20 | 2 |
| 6 | 6 | 20 | 23 | 85 | 19 | 2–3 |
| 6 | 7 | 22 | 24 | 85 | 18 | 1 |
| 6 | 8 | 21 | 24 | 85 | 20 | 1 |
| 6 | 9 | 20 | 20 | 85 | 22 | 1–2 |
| 6 | 10 | 21 | 22 | 85 | 19 | 1 |
| 6 | 11 | 22 | 24 | 85 | 19 | 0–1 |
| 6 | 12 | 21 | 23 | 86 | 18 | 0–1 |
| 6 | 13 | 20 | 21 | 86 | 23 | 1 |
| 6 | 14 | 20 | 21 | 86 | 23 | 1 |
| 6 | 15 | 20 | 20 | 85 | 20 | 0–1 |
| | Comparative Examples | | | | | |
| 6 | B1 | 17 | 17 | 80 | 45 | 3 |
| 6 | B2 | 17 | 19 | 79 | 36 | 2–3 |

Flow assessment: 0–5
0 very good
5 very poor
* Measuring instruments: BYK Gardner It will be understood that the specification and examples are illustrative but not limitative of the present invention and that other embodiments within the spirit and scope of the invention will suggest themselves to those skilled in the art.

We claim:

1. A polysiloxane-polyether-based copolymer which contains T units and comprises chains of randomly linked organopolysiloxane units and linear polyether units, in which the organopolysiloxane chains are linked to each other via polyether units, and wherein an organosiloxane unit in at least one of said chains is linked to an organosiloxane unit of another of said chains via a polyether unit linked by a carbon atom the one chain and by a —O—C-bond to the other chain, at least one T unit is formed by organopolysiloxane units linked to each other, the ratio of T units to total siloxy units ranging from 0.02 to 0.25, and the ratio of the number of polyether units to organopolysiloxane units is 0.07 to 0.33, and the maximum number of siloxane units per total molecule is 50.

2. A polysiloxane-polymer-based copolymer according to claim 1, of the formula

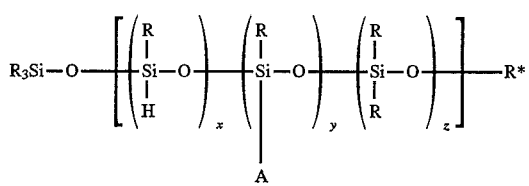

wherein
R is alkyl with 1 to 18 carbon atoms, a saturated or unsaturated $C_5$–$C_6$ ring system or an aromatic radical, wherein R may differ within the siloxane chain,
R* is $SiR_3$, —$(CH_2)_n[O(CH_2)_n]_m$—$O(CH_2)_n$—$R^1$ and when x is 0, optionally —$(CH_2)_n[O(CH_2)_n]_m$—$(CH_2)_{n-2}$—$CH$=$CH_2$
$R^1$ is —H, —OH, or

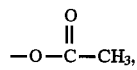

A is at least one of

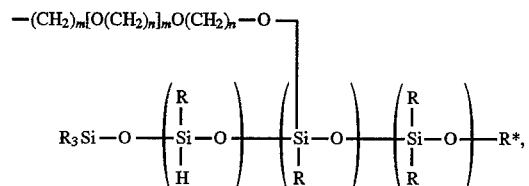

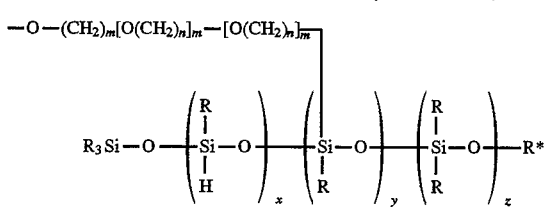

or optionally

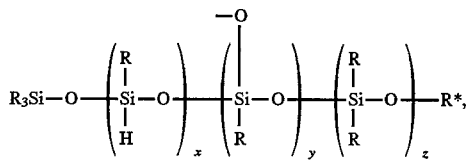

and can optionally contain at least one residue of the formula

—$(CH_2)_m[O(CH_2)_n]_m[$—$O(CH_2)_n]_m$ $R^1$, wherein n is 2, 3 or 4, m is 4 to 200, x is 0 to 9, y is 0 to 17, z is 0 to 50, and x+y+z≠0, and the various moieties in the polysiloxane chain can differ from one another.

3. Copolymers according to claim 1, characterized in that the organopolysiloxane units optionally contain free SiH groups.

4. A copolymer according to claim 1, containing linear polyether units which contain OH and allyl terminal groups.

5. A copolymer according to claim 1, containing linear mixed polyether units of ethylene oxide and propylene oxide.

6. A method of preparing a copolymer according to claim 1, which comprises reacting an organopolysiloxane with functional SiH groups with linear alkenyl-containing polyether having terminal OH groups in the presence of a strong base and thereafter optionally neutralizing to terminate the reaction.

7. The method according to claim 6, wherein the base has a $pK_b$ value <0 and a solubility in the reaction mixture of at least 1000 ppm.

8. The method according to 6, wherein the reaction is carried out until all the SiH groups have been completely removed.

9. In a
(a) solvent-containing, solvent-free or aqueous lacquer, paint, paste, mortar or coating,
(b) textile coating composition,
(c) composition for crosslinking resins or elastomers,
(d) foam or
(e) emulsion, the improvement which comprises incorporating therein as an additive a copolymer according to claim 1.

* * * * *

UNITED STATES PATENT AND TRADEMARK OFFICE
CERTIFICATE OF CORRECTION

PATENT NO. : 5,625,024
DATED : April 29, 1997
INVENTOR(S) : Schlitte, et al.

It is certified that error appears in the above-indentified patent and that said Letters Patent is hereby corrected as shown below:

Col. 19, line 16  After "$_m-$" insert -- O --

Col. 19, line 17  After "$_{n-2}-CH$" delete "$_2$"

Signed and Sealed this

Sixteenth Day of September, 1997

Attest:

BRUCE LEHMAN

Attesting Officer

Commissioner of Patents and Trademarks